(12) United States Patent
Rozmarynowski et al.

(10) Patent No.: US 9,700,956 B2
(45) Date of Patent: Jul. 11, 2017

(54) WELDING ELECTRODE STORAGE SYSTEM AND METHOD

(71) Applicant: Hobart Brothers Company, Troy, OH (US)

(72) Inventors: Scott Ryan Rozmarynowski, Greenville, WI (US); Brian Scott Bashore, Tipp City, OH (US)

(73) Assignee: HOBART BROTHERS COMPANY, Troy, OH (US)

( * ) Notice: Subject to any disclaimer, the term of this patent is extended or adjusted under 35 U.S.C. 154(b) by 305 days.

(21) Appl. No.: 13/760,934

(22) Filed: Feb. 6, 2013

(65) Prior Publication Data
US 2014/0217078 A1   Aug. 7, 2014

(51) Int. Cl.
| | |
|---|---|
| B23K 9/28 | (2006.01) |
| B23K 37/00 | (2006.01) |
| B23K 9/32 | (2006.01) |
| B23K 9/10 | (2006.01) |

(52) U.S. Cl.
CPC ............ *B23K 9/327* (2013.01); *B23K 9/1006* (2013.01)

(58) Field of Classification Search
CPC .... B23K 37/0294; B23K 9/1006; B23K 9/26; B23K 9/32; B23K 9/327
USPC .... 219/138, 121.11, 121.13–121.14, 121.34, 219/121.52–121.53, 129, 130.1, 136, 219/137 R, 137 PS, 137.2, 137.9; 294/146; 228/4.5, 41, 44.3, 49.1
See application file for complete search history.

(56) References Cited

U.S. PATENT DOCUMENTS

| | | | | |
|---|---|---|---|---|
| 2,253,403 | A * | 8/1941 | Steinert | 219/136 |
| 2,510,204 | A * | 6/1950 | Baird | B23K 9/186 |
| | | | | 219/137.9 |
| 2,751,485 | A * | 6/1956 | Sauer | B23K 3/0615 |
| | | | | 219/230 |
| 2,952,763 | A * | 9/1960 | Gustafsson | B23K 3/0615 |
| | | | | 219/229 |
| 3,108,176 | A * | 10/1963 | Simon | B23K 9/1333 |
| | | | | 206/0.6 |
| 3,297,856 | A * | 1/1967 | Gershon | B26F 3/12 |
| | | | | 219/223 |

(Continued)

FOREIGN PATENT DOCUMENTS

| | | | |
|---|---|---|---|
| CH | 677462 | A * | 5/1991 |
| CN | 1701889 | | 11/2005 |

(Continued)

OTHER PUBLICATIONS

International Search Report from PCT application No. PCT/US2014/014247, dated Jun. 5, 2014, 8 pgs.

(Continued)

*Primary Examiner* — Dana Ross
*Assistant Examiner* — Ket D Dang
(74) *Attorney, Agent, or Firm* — Fletcher Yoder P.C.

(57) ABSTRACT

A system includes a welding power supply. The welding power supply includes circuitry configured to produce power for a welding operation. The welding power supply also includes a compartment interior to the welding power supply and configured to hold one or more welding electrodes. In addition, the welding power supply may include a covering configured to be removably disposed in an opening of the compartment to allow access to the welding electrodes in the compartment.

4 Claims, 5 Drawing Sheets

(56) References Cited

U.S. PATENT DOCUMENTS

| | | | | |
|---|---|---|---|---|
| 3,309,492 | A | * | 3/1967 | Fields .................... B23K 9/285 219/121.11 |
| 3,350,535 | A | * | 10/1967 | Simon ................. B23K 9/1333 219/137.42 |
| 3,424,892 | A | * | 1/1969 | Wilcox .............. B23K 35/0266 219/137 R |
| 3,787,655 | A | * | 1/1974 | Anderson et al. .............. 219/72 |
| 4,085,286 | A | * | 4/1978 | Horsma .............. B29C 61/0608 156/273.9 |
| 4,161,643 | A | * | 7/1979 | Martin, Jr. ................ B23K 9/32 219/138 |
| 4,570,051 | A | * | 2/1986 | Miwa .................... G21C 21/00 141/4 |
| 4,894,512 | A | * | 1/1990 | Heusi .................. B23K 9/0061 219/130.4 |
| 5,266,772 | A | * | 11/1993 | Reed ........................ 219/137 R |
| 6,075,226 | A | | 6/2000 | Kishbaugh |
| 6,528,764 | B2 | | 3/2003 | Podgurski |
| 6,992,266 | B1 | * | 1/2006 | Di Novo et al. ......... 219/137.9 |
| 8,091,757 | B1 | * | 1/2012 | Stawarski .............. B23K 3/063 228/4.5 |
| 2003/0136773 | A1 | | 7/2003 | Bogner |
| 2004/0173613 | A1 | * | 9/2004 | Schroeder et al. ........... 220/276 |
| 2004/0182845 | A1 | * | 9/2004 | Crisler et al. ............. 219/130.1 |
| 2005/0155959 | A1 | * | 7/2005 | Bender et al. ................ 219/133 |
| 2005/0168002 | A1 | * | 8/2005 | Herring .................. B23K 9/32 294/146 |
| 2005/0258155 | A1 | * | 11/2005 | DeYoung ................ B23K 9/32 219/130.1 |
| 2007/0090163 | A1 | | 4/2007 | DiNovo |
| 2008/0011729 | A1 | * | 1/2008 | Brietbach ..................... 219/136 |
| 2008/0078753 | A1 | * | 4/2008 | Fulcer et al. ................. 219/136 |
| 2008/0149611 | A1 | * | 6/2008 | Roth ....................... B23K 9/32 219/137.7 |
| 2008/0156783 | A1 | * | 7/2008 | Vanden Heuvel ..... B23K 9/125 219/137.2 |
| 2009/0277882 | A1 | | 11/2009 | Bornemann |
| 2011/0284513 | A1 | | 11/2011 | Rappl |
| 2014/0246413 | A1 | * | 9/2014 | Rozmarynowski et al. . 219/137 PS |

FOREIGN PATENT DOCUMENTS

| | | | | |
|---|---|---|---|---|
| CN | 1938119 | | 3/2007 | |
| CN | 101374627 | | 2/2009 | |
| CN | 101419755 | | 4/2009 | |
| CN | 102133672 | | 7/2011 | |
| EP | 1247609 | | 10/2002 | |
| GB | 1057211 | | 2/1967 | |
| GB | 1157968 | | 7/1969 | |
| GB | 2044655 | | 10/1980 | |
| GB | 2044655 | A * | 10/1980 | ............... B23K 9/26 |
| JP | 5956998 | | 4/1984 | |
| JP | 02192879 | A * | 7/1990 | ............... B23K 9/10 |

OTHER PUBLICATIONS

International Search Report from PCT application No. PCT/US2014/017219, dated Aug. 12, 2014, 12 pgs.

* cited by examiner

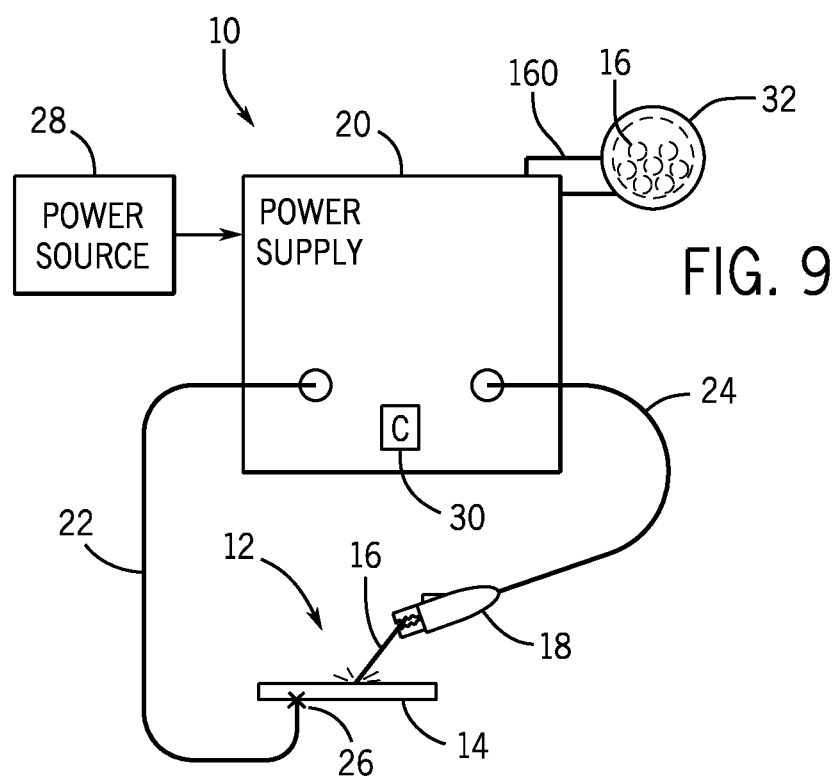

WELDING ELECTRODE STORAGE SYSTEM AND METHOD

BACKGROUND

The invention relates generally to welding systems and, more particularly, to a shielded metal arc welding (SMAW) system with integrated welding electrode storage.

Welding is a process that has increasingly become ubiquitous in various industries and applications. While such processes may be automated in certain contexts, a large number of applications continue to exist for manual welding operations. Welding systems generally include an electrode configured to pass an arc between a torch and a work piece, thereby heating the work piece to create a weld. In shielded metal arc welding (SMAW), or stick welding, the electrode is a consumable rod that melts into the weld to provide a filler material into the weld. In other words, a single rod serves both as an electrode and as the filler material. The electrode is held by a clamp, and a power supply provides welding power to the clamp and the electrode to produce the arc. When nearly all of an electrode is consumed to form the weld, the remainder of the electrode is discarded, a new electrode is inserted into the clamp, and the welding process is continued. Thus, several electrodes are often consumed during a welding session. Unfortunately, existing systems for storing and transporting these electrodes to and from the worksite have several disadvantages. For example, the original packaging that the electrodes come in is generally not air tight, allowing undesirable moisture to accumulate within the electrodes. In addition, it can be difficult to transport the many electrodes along with the other welding equipment needed for the welding process.

BRIEF DESCRIPTION

In an embodiment, a welding system includes a welder configured to output power to form an arc between a stick electrode and a workpiece. The welder includes an interior compartment configured to receive and store one or more additional stick electrodes.

In another embodiment, a welding power supply includes circuitry configured to produce power for a welding operation. The welding power supply also includes a compartment configured to hold one or more welding electrodes. In addition, the welding power supply includes a covering configured to be removably disposed in an opening of the compartment to allow access to the welding electrodes in the compartment.

In a further embodiment, a method includes receiving one or more electrodes via a compartment of a SMAW power supply. The method also includes sealing the welding electrodes in the compartment via a covering configured to be removably disposed in an opening of the compartment.

DRAWINGS

These and other features, aspects, and advantages of the present invention will become better understood when the following detailed description is read with reference to the accompanying drawings in which like characters represent like parts throughout the drawings, wherein:

FIG. 9 is a diagrammatical representation of an embodiment of a welding system having a welding electrode storage system.

DETAILED DESCRIPTION

Traditional electrode storage containers for shielded metal arc welding (SMAW) systems are generally provided separately from the components of the welding system. For example, an operator generally carries the welding electrodes in a separate container, in addition to a welding power supply and other equipment. It may be desirable and more efficient to provide SMAW systems with storage compartments that are integrated into preexisting components of the welding system. Thus, presently disclosed embodiments are directed to storing welding electrodes integrally with a power supply of the welding system. The power supply may include a compartment built into its body, or a handle, where the compartment is configured to receive and hold one or more welding electrodes. In some embodiments, the power supply may include a compartment that is attachable and detachable to and from an external portion of the power supply, so that the compartment may be carried with the power supply from one site to another, and removed from the power supply as desired. The power supply may include a cap that can be removably placed in an opening of the compartment, providing an air tight seal when the electrodes are stored therein. The disclosed embodiments allow an operator to carry all needed electrodes to a worksite and back, without handling excess equipment or exposing the electrodes to air. Because the electrodes are stored integrally with the other welding equipment, they are available for use wherever the equipment is located.

Figure 1:
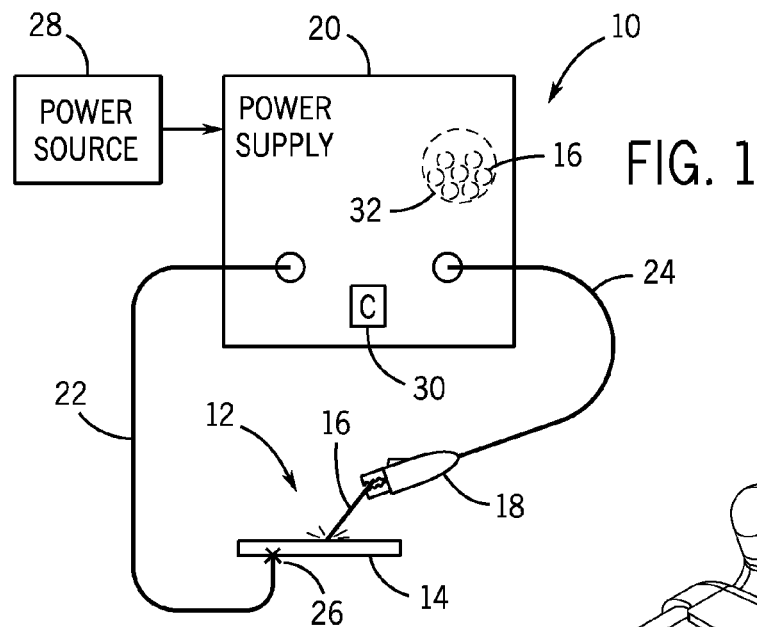
FIG. 1 is a diagrammatical representation of an embodiment of a welding system having a welding electrode storage system.

Turning now to the drawings, FIG. 1 is a diagrammatical representation of an embodiment of a welding system 10 configured to store welding electrodes. The welding system 10 is a SMAW system used to produce an electric arc 12 for heating a workpiece 14 via a consumable welding electrode 16. The electrode 16, also referred to as a "stick electrode", may include a metal core wire with a flux coating of various materials. Power is supplied to the metal core wire to produce the arc 12, which heats the workpiece 14 and melts the wire into a weld puddle formed on the workpiece 14. The flux coating may provide an atmospheric shield of the weld area, reduce weld contaminants, direct and stabilize the arc 12, produce a weld bead with a desired chemical composition, and so forth. An operator may manipulate the electrode 16 in relation to the workpiece 14 via an electrode holder or clamp 18. A power supply 20 provides electricity through weld cables 22 and 24 to produce the arc 12. For example, in some welding operations, the power supply 20 provides an electrical current through the weld cable 22 to a clamp 26 coupled to the workpiece 14. The current arcs from the workpiece 14 to the electrode 16, and returns to the power supply 20 through the clamp 18 and the weld cable 24. In some welding processes, the current may flow in the opposite direction.

A welding process (AC or DC) may be used to produce the desired weld, and the power supply 20 converts input power from a power source 28 to the desired power output. The power source 28 may represent the power grid, although other sources of power may also be used, such as power generated by an engine-driven generator, batteries, fuel cells, or other alternative sources. The power supply 20 includes circuitry 30, which may include power conversion circuitry, control circuitry, operator interface circuitry, and so forth. This circuitry 30 is configured to produce power that is suitable for welding.

Present embodiments of the power supply 20 are configured to receive and hold additional electrodes 16 for use in the welding process. The electrodes 16 may be located, for example, in an interior compartment 32 formed within the power supply 20, as shown. Upon depositing an entire electrode 16 onto the workpiece 14, an operator may select another electrode 16 from the compartment 32, insert it into the clamp 18, and continue welding. The electrodes 16 stored in the illustrated power supply 20 are available for use wherever the power supply 20 is located, and no additional carrying case is required.

Figure 2:
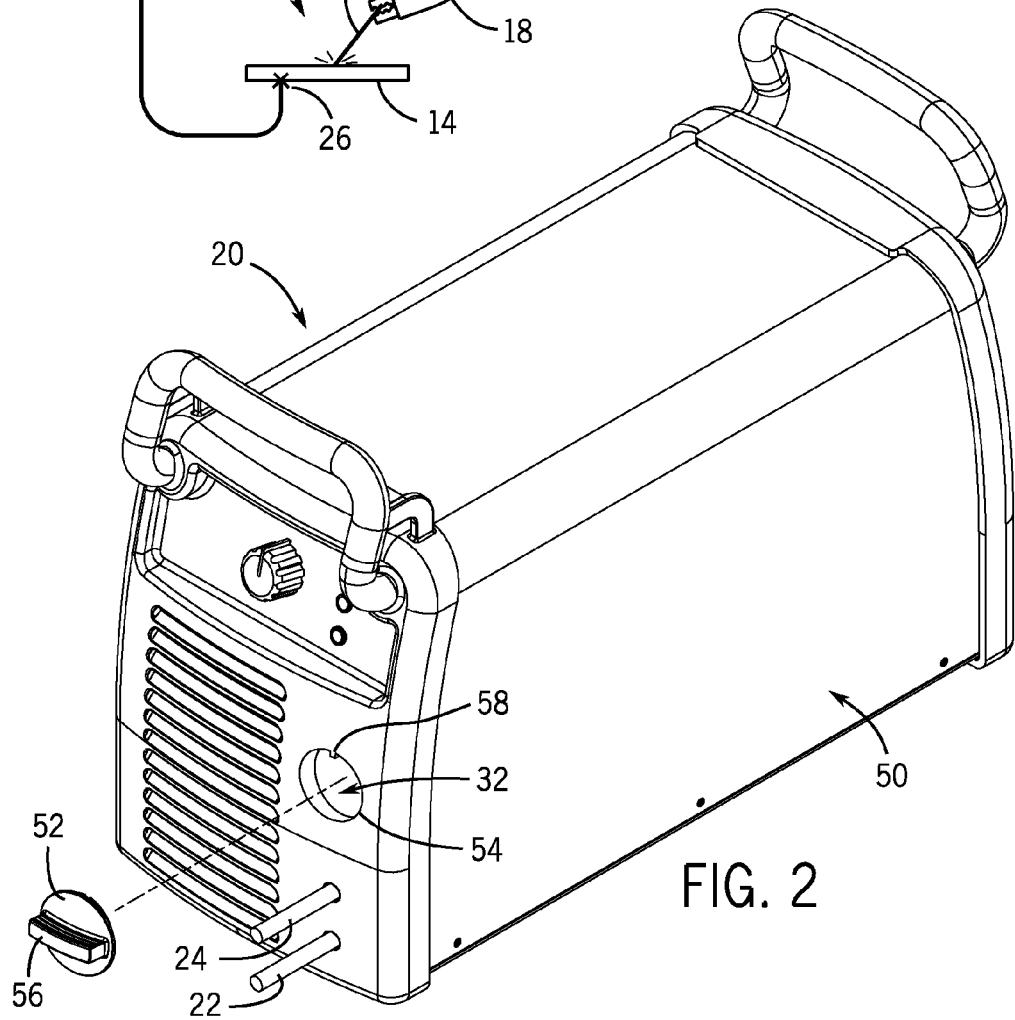
FIG. 2 is perspective view of an embodiment of a power supply of the welding system of FIG. 1.

FIG. 2 is a perspective view of an embodiment of the power supply 20 used to store the electrodes 16. In the illustrated embodiment, the power supply 20 includes the interior compartment 32 configured to receive and hold the electrodes 16. It should be noted that, in present embodiments, the compartment 32 is specifically dimensioned to receive and hold the electrodes 16. That is, the compartment 32 extends far enough in a longitudinal direction to receive the electrodes 16 fully within the compartment 32. For example, the length of the compartment 32 may fall within a range of approximately 13-15 inches to accommodate the electrodes 16. The compartment 32 may also have a large enough width or diameter dimension to accommodate a supply of approximately 1 to 10 pounds of electrodes 16. Depending on the type of electrodes 16 used, this width or diameter dimension may be within a range of approximately 1.5-5 inches, 2.5-4.5 inches, or 3-4 inches. It should be noted that the compartment dimensions are not limited to the examples given above.

The compartment 32, as shown, may be located in a body 50 or chassis of the power supply 20. The power supply 20 may be designed so that the compartment 32 for storing electrodes 16 does not interfere with the circuitry 30 configured to produce the welding power output. In the illustrated embodiment, the compartment 32 includes a cylindrical tube extending into the body 50 of the power supply 20, but other shapes and arrangements may be possible as well. In addition, the power supply 20 may include a removable cap 52 that forms one end of the compartment 32. This cap 52 acts as a covering that can be removably disposed in an opening 54 of the compartment 32 to allow access to the electrodes 16. The cap 52 may be secured within the opening 54 to secure the electrodes 16 within the compartment 32, and the cap 52 may be removed to facilitate loading and unloading of the electrodes 16.

It may be desirable for the integrated compartment 32 to be hermetically sealed (or air tight) in order to preserve the electrodes 16 stored therein. In some instances, unnecessary exposure of the electrodes 16 to air and moisture can negatively affect weld performance, particularly due to degradation of the flux coating. For example, the electrodes 16 may absorb moisture when exposed to the atmosphere, and such moisture in the electrodes can lead to undesired porosity within the weld. To reduce such exposure of the electrodes 16 stored in the compartment 32, the power supply 20 may include a specially designed cap 52 for maintaining an air tight seal between the compartment 32 and an outside atmosphere. The cap 52 may be configured to maintain a press-fit, threaded, snap tight, or other type of connection with the opening 54. In the illustrated embodiment, the cap 52 includes a protrusion 56 extending outward from the cap 52 to provide a gripping feature for a welding operator. Other mechanisms may be used to provide access to the cap 52 for insertion and/or removal of the cap 52 from the opening 54 of the compartment 32. In certain embodiments, the cap 52 may be loosened or tightened to provide an air tight seal of the compartment 32 via a quarter turn of the cap 52, once placed in the opening 54. This may provide a relatively easy way for a welding operator to access or protectively seal the stored electrodes 16. However, for a threaded connection, any number of turns may be possible for providing the desired seal of the compartment 32. In some embodiments, the opening 54 may include a notch 58 or stop against which the cap 52 is brought to rest when the opening 54 is fully sealed. This may serve as an indicator that an effective seal is provided to the compartment 32. Other embodiments of coverings that can be removably placed in the opening 54 may be used to provide an air tight enclosure for the electrodes 16.

Figure 3:
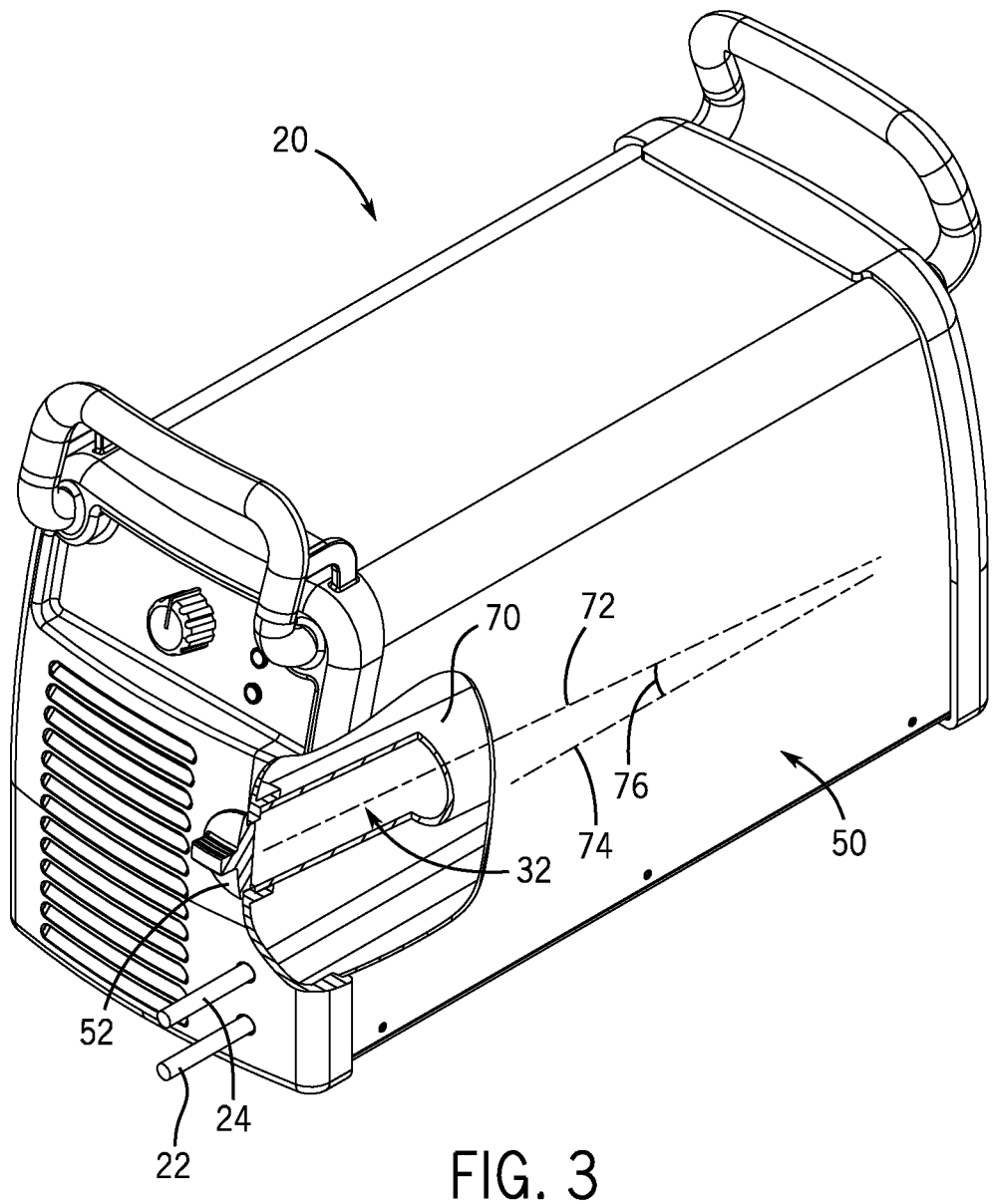
FIG. 3 is a perspective partial cutaway view of an embodiment of the power supply of FIG. 2.

FIG. 3 is a perspective partial cutaway view of the power supply 20 shown in FIG. 2, with the cap 52 closed over the opening 54. As mentioned previously, and shown in the cutaway view, the compartment 32 for holding the electrodes 16 may be a cylindrical enclosure 70 extending into the body 50 of the power supply 20. In some embodiments, the compartment 32 may be configured to maintain the electrodes 16 within the compartment 32 when the cap 52 is removed. For example, the compartment 32 may include a lip at the opening 54 for keeping the electrodes 16 from falling out of the opening 54. Such a lip may maintain the electrodes 16 in the compartment 32 without obstructing an operator from reaching into the compartment 32 to select one of the electrodes 16.

As another example, the compartment 32 may be inclined to maintain the electrodes 16 within the compartment 32. This is shown clearly in the illustrated embodiment, where a longitudinal axis 72 of the compartment 32 is inclined downward relative to a horizontal axis 74 of the power supply 20. The longitudinal axis 72 may be inclined downward from the end of the compartment with the opening 54 to the opposite end of the compartment 32. This may keep the electrodes 16 from falling out through the opening 54 of the compartment 32 when the cap 52 is removed. An incline angle 76 between the axes 72 and 74 may be large enough to maintain the electrodes 16 inside the compartment 32, yet small enough to facilitate relatively easy retrieval of the electrodes 16. For example, in certain embodiments, the incline angle 76 may be equal to approximately 5, 10, or 20 degrees, or within a range of approximately 0-30 degrees. In other embodiments, the incline angle 76 may be larger, for example up to approximately 90 degrees in some larger machines. In addition, the incline angle 76 may accommodate a desired spatial arrangement of other components (e.g., the circuitry 30) internal to the body 50 of the power supply 20.

Figure 4:
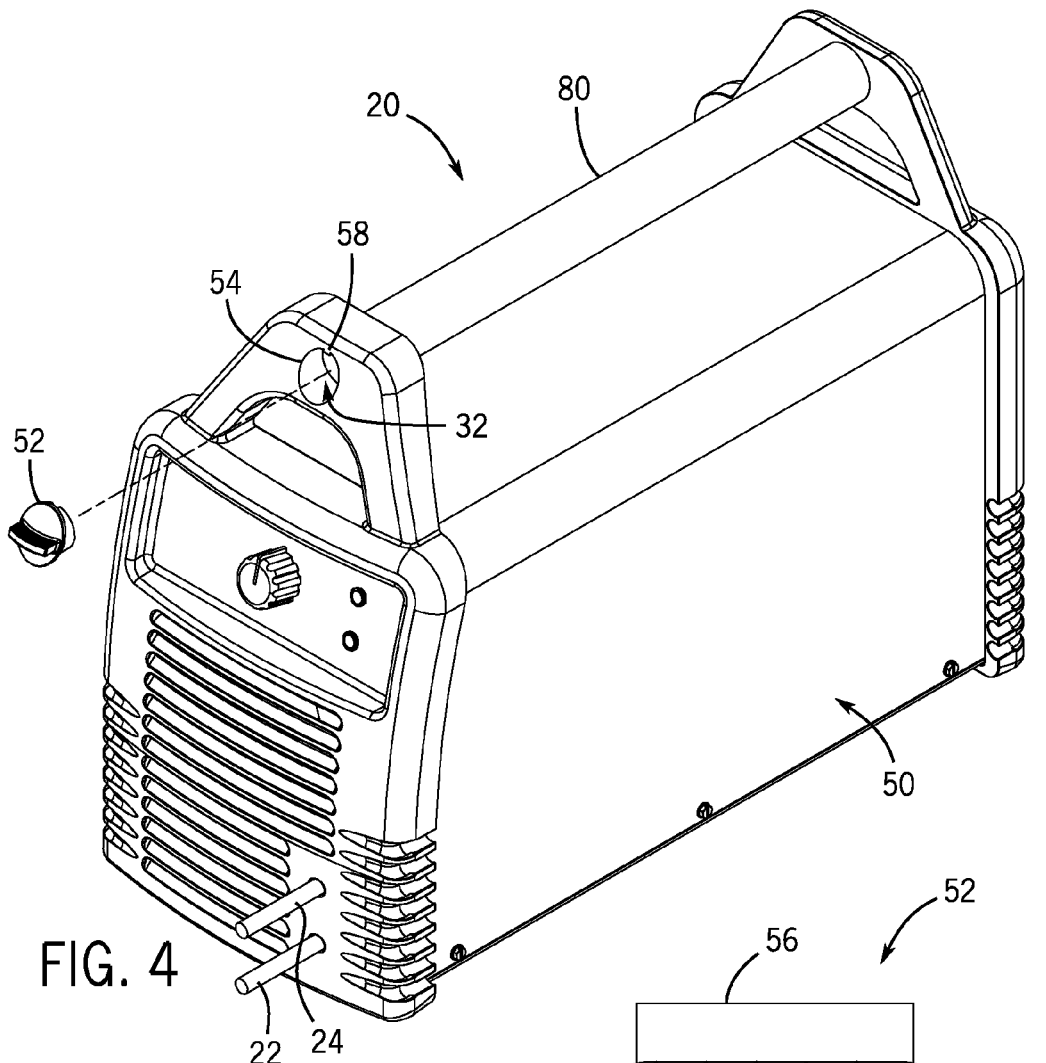
FIG. 4 is a perspective view of an embodiment of a power supply of the welding system of FIG. 1.

FIG. 4 is a perspective view of another embodiment of the power supply 20 with a built-in electrode storage compartment 32. In the illustrated embodiment, the power supply 20 includes a handle 80 that extends along the length of the power supply 20. The handle 80 may facilitate lifting and carrying of the power supply 20 to and from a worksite. In addition, the handle 80 may be used for storing the additional electrodes 16. That is, the compartment 32 used to receive and hold the electrodes 16 may be internal to the handle 80. This arrangement may allow more room within the body 50 for arranging the circuitry 30 and other internal components of the power supply 20. In addition, the components internal to the body 50 may be arranged more efficiently, possibly reducing the total weight of the power supply 20. As will be appreciated, the compartment 32 may be smaller, able to hold fewer electrodes 16, when it is located in the handle 80 as opposed to the body 50 (FIGS. 2 and 3) due to size constraints for the handle 80. For example, a compartment 32 located in the handle 80 may be able to store approximately 1 pound of additional electrodes 16, while a compartment 32 located in the body 50 may be able to store up to approximately 10 pounds of additional electrodes 16. In some embodiments, there may be multiple compartments throughout the power supply 20, including one in the handle 80 in addition to another in the body 50. The illustrated embodiment shows the same arrangement of the cap 52 configured to close the opening 54 as described in relation to FIG. 2.

Figure 5:
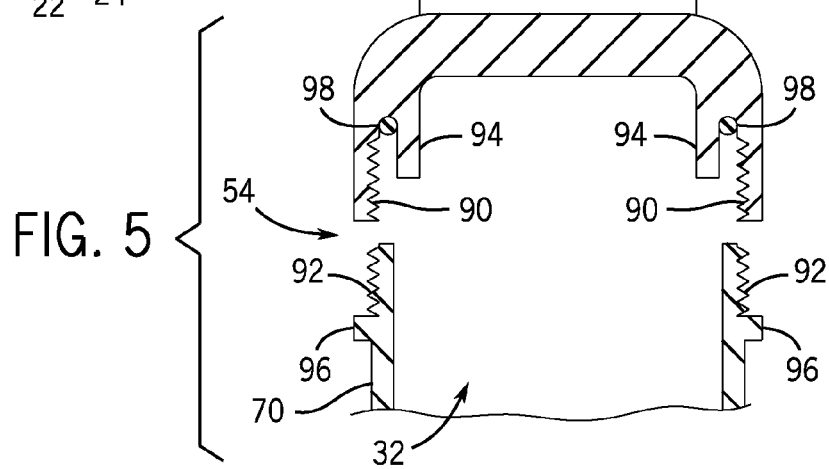
FIG. 5 is a cross section of an embodiment of the welding electrode storage system of FIG. 1.

As described above, the compartment 32 may be hermetically sealed using the cap 52 or other covering configured to close the opening 54 of the compartment 32. One example of this air tight seal is provided in FIG. 5, which illustrates a cross section of an embodiment of the cap 52 and the compartment 32. In the illustrated embodiment, the cap 52 includes a pair of protrusions 90 and 94 configured to engage with each side of the cylindrical enclosure 70 that forms the compartment 32. More specifically, an outer protrusion 90 of the cap 52 may be configured to engage threads 92 on the outside of the enclosure 70. As the cap 52 is threaded onto the enclosure 70, an inner protrusion 94 (or overlap) of the cap 52 engages with the inside of the enclosure 70, providing an overlapping seal between the compartment 32 and the outside atmosphere. When the cap 52 is threaded entirely onto the enclosure 70, the outer protrusion 90 may contact an abutment surface 96 of the enclosure 70. The cap 52 may include an o-ring 98 disposed between the protrusions 90 and 94. Outside air may not be able to enter the compartment 32 because of the multiple overlapping seals formed via the connection between the cap 52 and the enclosure 70. These seals are formed between the abutment surface 96 and the outer protrusion 90, the outer protrusion 90 and the threads 92, the o-ring 98 and the enclosure 70, and finally between the inner protrusion 94 and the enclosure 70.

It should be noted that additional features may be included in the cap 52 and the enclosure 70. For example, the enclosure may include threads on the inner surface as well, while the cap 52 may include mating threads along the inner protrusion 94. In some embodiments, additional overlapping surfaces may be present. In other embodiments, fewer overlapping surfaces may be used. The enclosure 70 may not include the abutment surface 96, or the cap 52 may not include the o-ring 98. In still other embodiments, the cap 52 and the enclosure 70 may not include threads at all, but may rely on overlapping sections that are press-fit or snapped into place. The cap 52 may ultimately provide an air tight seal of the compartment 32 used to hold the electrodes 16, so that the electrodes 16 are not affected by exposure to air and moisture.

Figure 6:
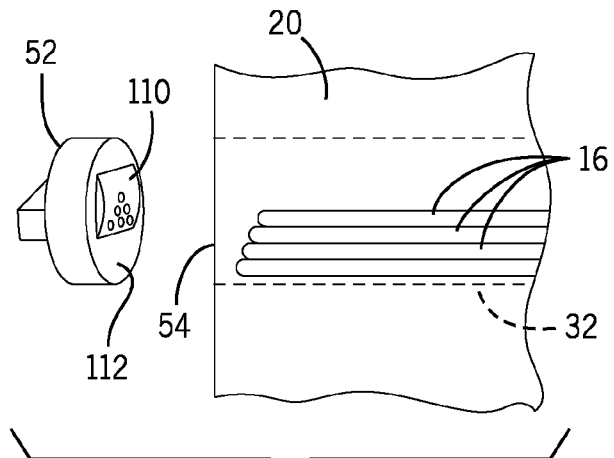
FIG. 6 is a diagrammatical representation of an embodiment of the welding electrode storage system of FIG. 1.

Although the cap 52 may provide a reliable seal to keep air from entering the compartment 32 once the cap 52 is closed over the opening 54, air may still enter the compartment 32 whenever the cap 52 is removed. The cap 52 may be removed relatively often, so that the electrodes 16 can be loaded into the compartment 32, or a new electrode 16 can be selected from the compartment 32 for use in a welding process. Because air can enter the compartment 32 during these times, moisture may accumulate in the compartment 32. As discussed above, moisture can negatively affect the electrodes 16, so it may be desirable to remove excess moisture from the compartment 32 once the compartment 32 is sealed. As an example, FIG. 6 is an embodiment of the power supply 20, which includes a desiccant 110 for removing moisture from the compartment 32. In the illustrated embodiment, the desiccant 110 is located on an inside surface 112 of the cap 52, but in other embodiments it may be positioned inside the compartment 32. The desiccant 110 may be removably disposed on the compartment covering (e.g., inside of the cap 52), or it may be affixed to the covering. The desiccant 110 absorbs moisture within the compartment 32 in order to protect the integrity of the flux coated electrodes 16 stored therein. In some embodiments, the desiccant 110 may change colors when it is becomes saturated, serving as a visual indicator for an operator to replace the desiccant 110. In embodiments where the desiccant 110 is fixed to the covering, the covering may be replaced when the desiccant 110 is fully saturated.

Figure 7:
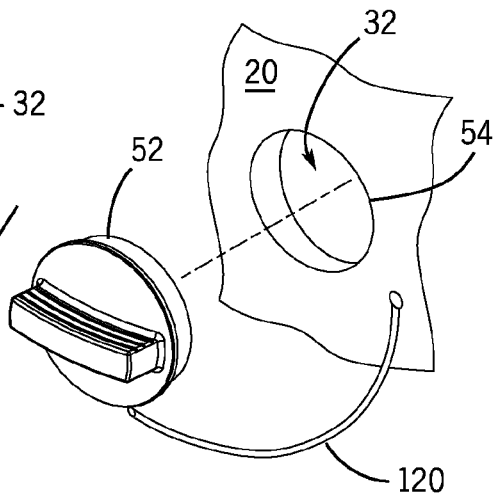
FIG. 7 is a perspective view of an embodiment of the welding electrode storage system of FIG. 1.

The cap 52 is removable from the opening 54 of the compartment 32, but it generally remains closed over the opening 54 when access to the electrodes 16 is not needed. This keeps air, moisture, and contaminants away from the electrodes 16, and maintains the electrodes 16 in the accessible compartment 32 of the power supply 20. Therefore, it may be desirable to include a mechanism for maintaining the cap 52 near the power supply 20 so that an operator does not lose the cap 52. For example, as shown in FIG. 7, the cap 52 may be coupled to the power supply 20 via a tether 120. The tether 120 may connect the cap 52 to an outside wall of the power supply 20, as illustrated, or to an inside surface of the compartment 32. In other embodiments, the cap 52 may include a magnet or some other attachment mechanism so that is can be attached directly to an outside surface of the power supply 20.

Figure 8:
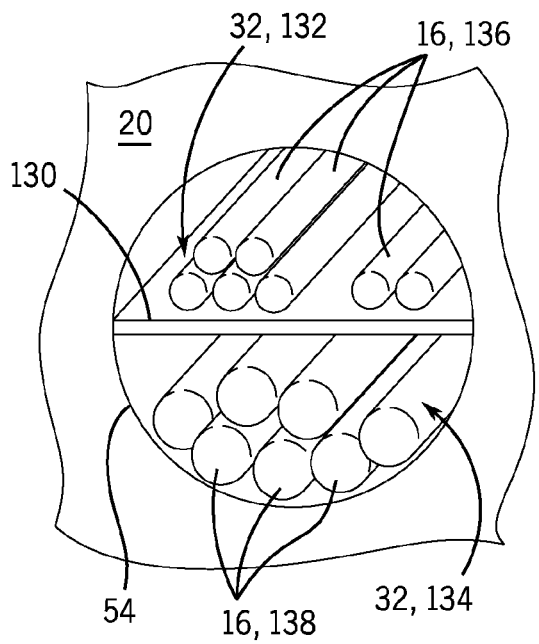
FIG. 8 is a perspective view of an embodiment of the welding electrode storage system of FIG. 1.

FIG. 8 is an embodiment of the power supply 20, which has an internal compartment 32 with a divider 130. The divider 130 may separate the compartment 32 into two smaller compartments 132 and 134. This allows the same compartment 32 to maintain separate stores of two different types of welding electrodes 16. In the illustrated embodiment, the upper compartment 132 contains relatively smaller electrodes 136, while the lower compartment 134 contains relatively larger electrodes 138. This arrangement may allow for an operator to organize multiple types and sizes of the electrodes 16 needed for a welding job within the same power supply 20 so that fewer pieces of equipment are transported to the worksite. In some embodiments, there may be multiple dividers 130 in the same compartment 32 of the power supply 20. The dividers 130 may be removable from the compartment 32, so that the compartment 32 can be tailored for the number of different types of electrodes 16 that are stored therein. More specifically, the dividers 130 may be inserts that an operator can slide into the compartment 32 along one or more guides built into the compartment 32. In addition, the divider 130 may include one or more guide features that allow a smaller divider to be inserted and added to the divider 130. This may allow an operator to selectively insert the dividers to form two, three, four, or more separate compartments for receiving different sized electrodes 16.

The embodiments illustrated in FIGS. 1-8 are directed to power supplies 20 with the compartment 32 for storing electrodes 16 internal to the power supply 20. These internal storage compartments may increase an amount of protection of the electrodes 16 stored therein. However, in other embodiments, the power supply 20 may include the compartment 32 as a feature that is attachable and detachable to and from an external portion of the power supply 20. FIG. 9 is a diagrammatical representation of one such embodiment of the welding system 10. The compartment 32 may be attached to the outer portion of the power supply 20 via an attachment feature 160. This attachment feature 160 may include a bracket, hanger, mount, clamp, or other suitable attachment mechanism specially designed to attach the compartment 32 to an exterior portion of the power supply 20. The attachment feature 160 may be built into the compartment 32, the exterior portion of the power supply 20, or both. In the illustrated embodiment, the attachment feature 160 includes a bracket disposed on an outer corner of the power supply and configured to receive the cylindrical compartment 32. In other embodiments, the compartment 32 may be a different shape, such that a different attachment feature 160 is used. In addition, the exterior portion to which the compartment 32 is attached may include a side wall, top, or corner of the body 50 of the power supply 20, or the handle 80 of the power supply. For example, the compartment 32 may be attachable to the handle 80 of the power supply 20 via a pipe clamp device that is built into the cylindrical handle 80 and configured to receive the compartment 32.

In embodiments where the compartment 32 is attached to an external portion of the power supply 20, the compartment 32 may be detached from the power supply 20. This may provide an operator with both an ease of access to the electrodes 16 and an ease of transportation of the entire welding system 10. Specifically, the operator can transport the electrodes 16 in the compartment 32 attached to the power supply 20 from one worksite to another. Once at a new worksite, the operator may position the body 50 of the power supply 20 as desired, detach the compartment 32 of the power supply 20, and carry the compartment 32 closer to a weld area so that the electrodes 16 are even more accessible. When it is time to transport the welding system 10 to a new location, the compartment 32 may be attached to the external portion of the power supply 20 again. The techniques disclosed above with reference to the compartment 32 and the cap 52 of FIGS. 2-8 may be similarly applied to the attached compartment 32 of FIG. 9.

Figure 10:
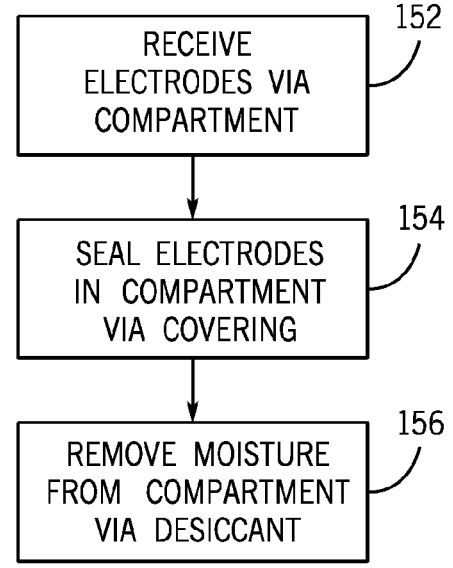
FIG. 10 is a process flow diagram of an embodiment of a method for storing welding electrodes in the welding electrode storage system of FIGS. 1 and 9.

FIG. 10 is a process flow diagram of an embodiment of a method 150 for storing the electrodes 16 integrally with the power supply 20. The method 150 includes receiving (block 152) one or more of the electrodes 16 via the compartment 32 of the power supply 20. The electrodes 16 may be placed therein by an operator before the operator transports the power supply 20 to a welding worksite. The compartment 32 may be inclined so that the electrodes 16 are received with relative ease through the opening 54. The method 150 also includes sealing (block 154) the electrodes 16 into the compartment 32 via a covering (e.g., cap 52) placed in the opening 54 to the compartment 32. Sealing (block 154) the electrodes 16 in the compartment 32 may involve closing the cap 52 so that no air can enter or exit the compartment 32. This may keep moisture from adversely affecting the electrodes 16, while keeping the electrodes 16 from falling out of the compartment 32. The method 150 may include removing (block 156) moisture from inside the compartment 32 via the desiccant 110. In some instances, the desiccant 110 may be coupled to the inside surface 112 of the cap 52, so that it can be accessed for replacement.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding power supply, comprising:
    circuitry configured to produce power for a welding operation;
    a handle of the welding power supply, wherein the handle comprises a compartment integrally formed in the handle, wherein the compartment is configured to hold and surround one or more welding electrodes, and wherein the compartment comprises an upper surface disposed above the one or more welding electrodes when the one or more welding electrodes are disposed within the compartment; and
    a covering configured to be removably disposed in an opening of the compartment to allow access to the welding electrodes in the compartment, wherein the covering is configured to create a seal between the compartment and an outside atmosphere.

2. The welding power supply of claim 1, comprising a desiccant removably disposed against an inner portion of the covering, wherein the desiccant removes moisture from the compartment when the covering is disposed in the opening.

3. The welding power supply of claim 1, wherein the compartment is generally cylindrical with the opening at a first end of the cylindrical compartment, and a longitudinal axis of the cylindrical compartment is inclined downward from the first end to an opposite second end of the cylindrical compartment.

4. The welding power supply of claim 1, wherein the compartment comprises a lip disposed at the opening to maintain the welding electrodes within the compartment.

* * * * *